Jan. 25, 1944.  J H. HUNT ET AL  2,339,859
WHEEL
Filed Jan. 21, 1942  2 Sheets-Sheet 1
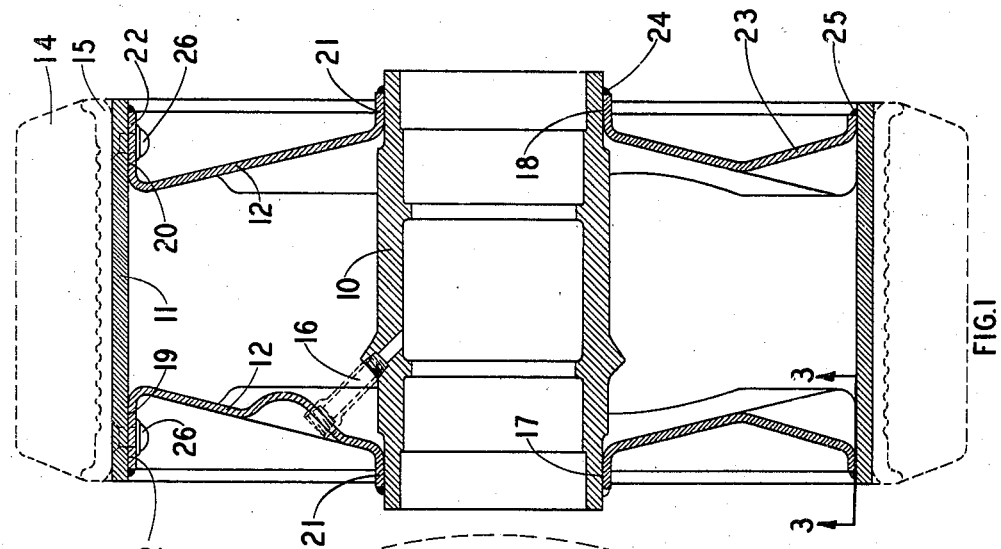
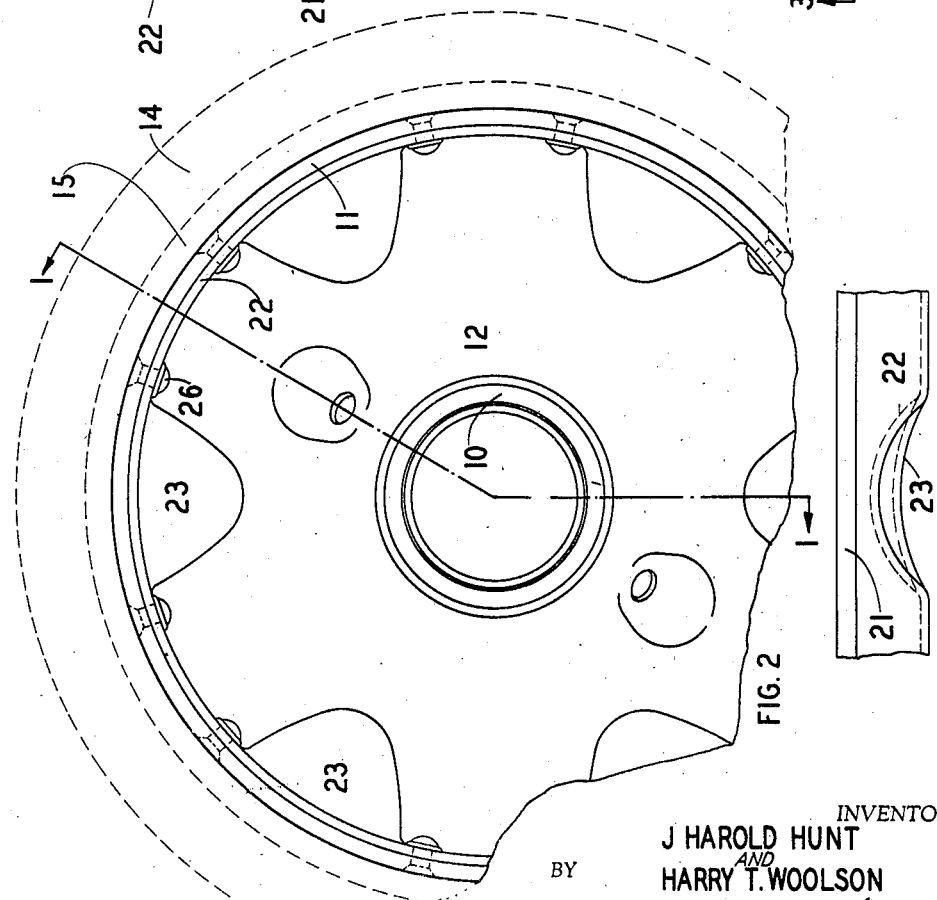
INVENTOR.
J HAROLD HUNT
AND
HARRY T. WOOLSON
BY Carroll R. Taber
ATTORNEY

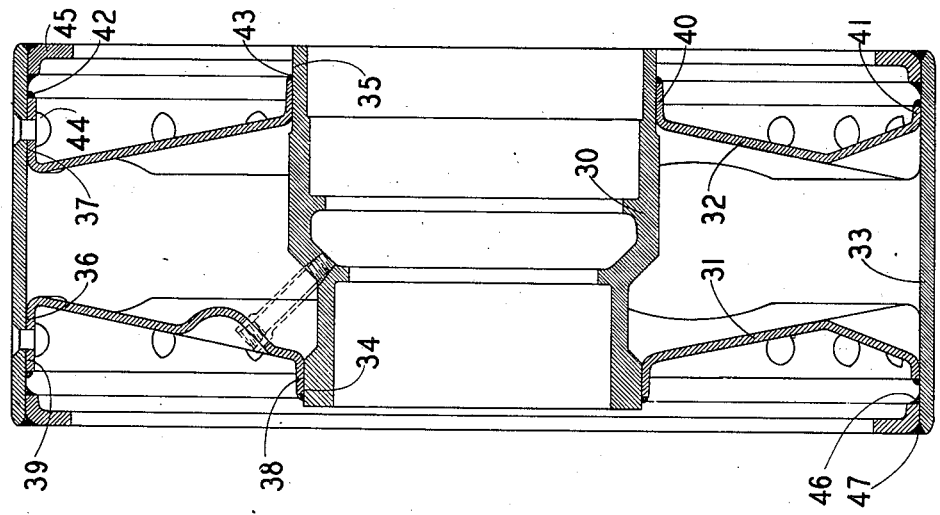
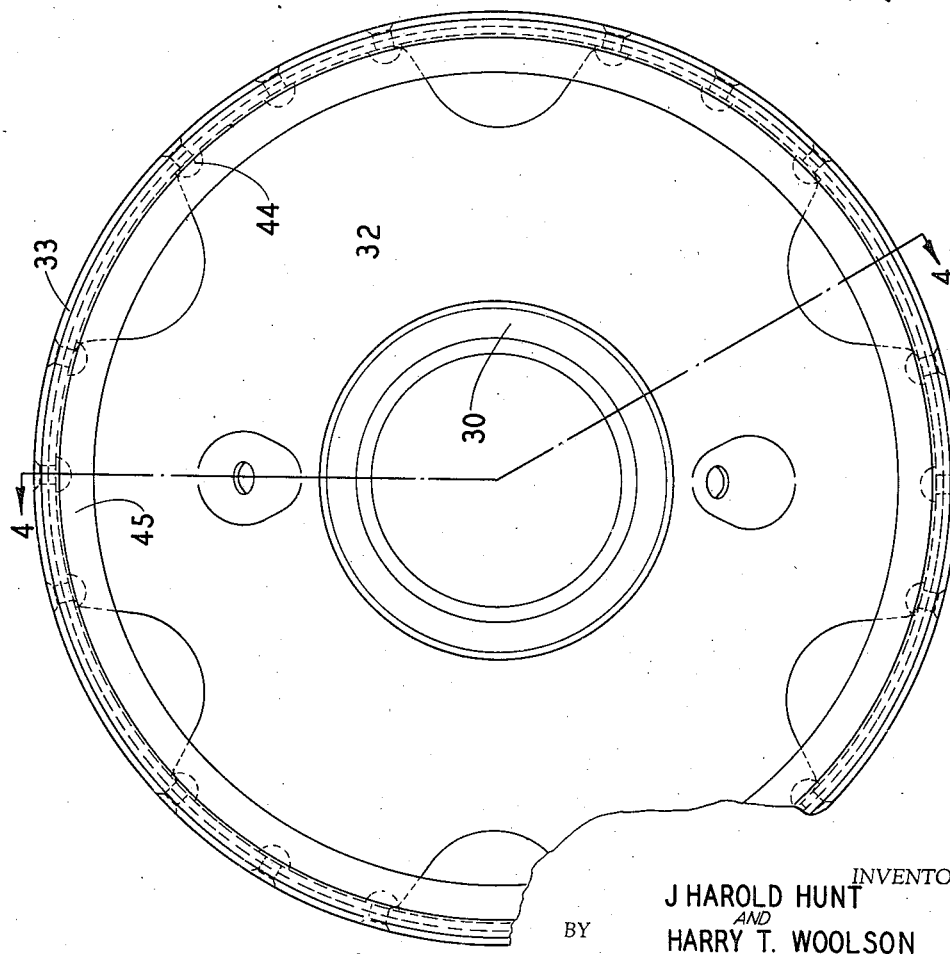

Patented Jan. 25, 1944

2,339,859

UNITED STATES PATENT OFFICE 2,339,859

WHEEL

J Harold Hunt, Lansing, and Harry T. Woolson, Detroit, Mich., assignors to Motor Wheel Corporation, Lansing, Mich., a corporation of Michigan, and Chrysler Corporation, Detroit, Mich., a corporation of Delaware Application January 21, 1942, Serial No. 427,550

3 Claims. (Cl. 301—64)

This invention relates to wheels suitable for use with vehicles employing a caterpillar drive. More specifically, it relates to bogey and/or idler wheels for such vehicles.

The principal object of the invention is to provide a wheel of the character mentioned which can be quickly and economically manufactured. This object is attained by utilizing a minimum number of parts and so arranging the parts in the final assembly that the permanent attachment of the parts together can be conveniently effected after such final assembly.

Another object of the invention is to provide a wheel which is of light weight but of great strength. This object is attained in part by utilizing in each wheel a pair of pressed metal load carrying disks of relatively light gauge and so arranging the disks between the hub and the rim as to provide for a truss-like structure which offers great resistance to load and shock in all directions.

Other objects will become apparent from the following description, when read in connection with the accompanying drawings, wherein—

Figure 1 is a sectional view of a wheel embodying our invention, taken on substantially the line 1—1 of Figure 2;

Figure 2 is a fragmentary front elevation of the wheel shown in Figure 1;

Figure 3 is a fragmentary view of one of the wheel disks taken on the line 3—3 of Figure 1;

Figure 4 is a sectional view of a slightly modified form of the wheel, taken on the line 4—4 of Figure 5; and Figure 5 is a front elevational view of the wheel shown in Figure 4.

The wheel shown in Figures 1, 2 and 3 consists of a hub member 10, a rim member 11, a pair of pressed metal load carrying disks 12, and means for securing these parts together. The outer surface of the rim member 11 is adapted to receive a tire 14 and felly 15, as shown in dotted lines. One of the disks and the hub are formed to receive a pair of grease conduits 16, as shown in dotted lines. The tire, felly and grease conduits are not a part of the wheel proper, but are attached thereto for reasons which will be obvious.

The hub member 10 is of generally cylindrical shape and may comprise a steel casting. The hub is formed to provide an internal configuration which will cooperate with an axle and bearings, not shown. The external surface of the hub is formed to provide a pair of axially spaced apart seats 17 and 18 adjacent its opposite ends.

The rim member 11 is of generally cylindrical shape and may comprise a flat strip of metal coiled and welded to provide the cylindrical formation shown. As previously mentioned, the external surface of rim member 11 is formed to provide a seat for a tire felly. The internal surface of the rim is formed to provide a pair of axially spaced apart seats 19 and 20 located adjacent the opposite ends thereof.

The pressed metal load carrying disks 12 are of generally frusto-conical formation, as shown. Each disk is provided with a central opening and with laterally extending flanges 21 and 22 at its inner and outer peripheries. At its outer periphery, each disk is provided with a plurality of circumferentially spaced apart radial corrugations or depressions 23 which are of a maximum depth slightly less than the width of flange 22 (see Figure 3). The corrugations are here shown as being of a length between one-third and one-half of the radial extent of the disk. The corrugations 23 are inclined in the opposite direction to the inclination of the conical disk. Thus, the corrugations serve to reinforce the disk in the region of its outer periphery.

The four parts of the wheel (hub, rim and disks) are assembled as shown in Figure 1. The seats 17 and 18 on the hub 10 are spaced farther apart than are the seats 19 and 20 on the rim 11. Thus, the disks 12 incline axially inwardly from the hub to the rim. The flanges 21 and 22 on the disks 12 are formed to extend axially outwardly when the disks are assembled with the hub and rim. Thus, convenient access to the flanges is afforded, for the purpose of permanently attaching the flanges to their seats.

The flanges are secured to their respective seats primarily by continuous annular welds 24 and 25 which integrally join the free edges of the flanges to their seats. If desired, rivets 26 may be employed for securing the flanges 22 to the rim 11.

The disks 12 are formed of a suitable size to provide a press fit between the flanges 21 and 22 and their respective seats. In addition to other advantages, this serves to securely hold the parts in assembled relation during the welding and riveting operations.

From an examination of Figure 1, it will be apparent that the wheel is so assembled as to provide a truss or girder-like construction which provides great resistance to load and shock, even though the disks 12 be formed of relatively light gauge metal. By arranging the disks with their seats on the hub spaced farther apart than their seats on the rim, great resistance to lateral shock is provided. By utilizing disks of frusto-conical form, great resistance to radial load and shock is provided. The corrugations 23 serve to strengthen and reinforce the wheel with respect to both kinds of loads and shocks.

In addition to being light and strong, the present wheel can be quickly and easily manufactured. It consists of only four separate parts, plus the means for securing the parts together. The parts are so constructed that they can each be easily formed separately and quickly assembled by pressing the disk flanges into engagement with their seats. They can be permanently secured together, after final assembly, by forming a weld between the outer edge of each flange and its seat. This can be done entirely from the outside of the wheel. Likewise, the rivets can be applied, if utilized, from the outside of the wheel after final assembly.

The modified form of wheel shown in Figures 4 and 5 is generally similar to the wheel just described. The principal difference resides in the form of hub employed and the use of two annuli secured to the inner surface of the rim adjacent its edges.

In this modification, the hub 30 is of generally cylindrical form but is of slightly larger diameter at one end. Thus, the two load carrying disks 31 and 32 are likewise of different diameters. Disks 31 and 32 are formed of pressed metal and are positioned between the hub 30 and a rim 33. Hub 30 is provided with seats 34 and 35 on its outer surface near its opposite ends. Rim 33 is provided with seats 36 and 37 on its inner surface near its opposite ends. Disk 31 is provided with flanges 38 and 39 at its inner and outer peripheries; and disk 32 is provided with flanges 40 and 41 at its inner and outer peripheries.

The wheel of Figures 4 and 5 is assembled by pressing the flanges on the disks into engagement with their respective seats on the rim and hub. The parts thus assembled are secured together by welds 42 and 43 integrally joining the outer edges of the disk flanges to their respective seats. Rivets 44 may be employed for connecting the disk flanges to the rim, if desired.

An annulus 45 of generally L-shaped cross-section and of limited radial extent is secured to each of the seats on the inner surface of the rim 33 axially outwardly of the disk flanges by welds 46 and 47 integrally uniting the opposite ends of one leg of the annulus to the rim seat. By reason of the limited radial extent of annulus 45, it will be apparent that the welds 46 and 47 can be conveniently formed from the outside of the wheel after the annulus has been installed in the desired position. It will also be apparent that the welds 42 and 43 may likewise be formed after annulus 45 has been installed, if desired. Annuli 45 serve to reinforce the wheel and also as track guides when the wheel is used as an idler.

The wheel of Figures 1, 2 and 3 is especially suited for use as a bogey wheel; and the wheel of Figures 4 and 5 is especially suited for use as an idler wheel. It will be obvious, however, that the two wheels are essentially the same and that either may be used for either purpose.

The scope of the invention is indicated in the appended claims.

We claim:

1. A wheel of the character defined comprising a rim member having axially spaced apart annular seats on its inner surface near the opposite ends thereof, a hub member disposed within and in concentric relation to said rim member and having axially spaced apart annular seats on its outer surface near the opposite ends thereof, a pair of pressed metal annular disks of frusto-conical form having flanges at their inner and outer peripheries, each of said disks being provided with a plurality of circumferentially spaced apart corrugations at its outer periphery which extend into the outer peripheral flange and which are inclined in the opposite direction to the inclination of the cone of the disk, the radial extent of said corrugations being approximately between one-third and one-half of the radial extent of the disk, each of said disks being disposed between said hub and rim member with the flanges at the inner and outer peripheries extending axially outwardly and engaging the seats at the corresponding end of the rim and hub members, and means for permanently securing each of said flanges to its seat.

2. A wheel of the character defined comprising a rim member having axially spaced apart annular seats on its inner surface near the opposite ends thereof, a hub member disposed within and in concentric relation to said rim member and having axially spaced apart annular seats on its outer surface near the opposite ends thereof, a pair of pressed metal annular disks of frusto-conical form having flanges at their inner and outer peripheries, each of said disks being provided with a plurality of circumferentially spaced apart corrugations at its outer periphery which extend into the outer peripheral flange and which are inclined in the opposite direction to the inclination of the cone of the disk, the radial extent of said corrugations being at least one-third of the radial extent of the disk, each of said disks being disposed between said hub and rim member with the flange at the inner and outer peripheries extending axially outwardly and engaging the seats at the corresponding end of the rim and hub members, and means for permanently securing each of said flanges to its seat.

3. A wheel as defined in claim 1 wherein the maximum axial depth of the corrugations of each disk is slightly less than the width of the flange at the outer periphery of the disk.

J HAROLD HUNT.
HARRY T. WOOLSON.